United States Patent [19]

James et al.

[11] Patent Number: 4,475,191

[45] Date of Patent: Oct. 2, 1984

[54] DISTRIBUTED TIME DIVISION MULTIPLEXING BUS

[75] Inventors: Dennis B. James, Rumson; Bryan S. Moffitt, Red Bank; Douglas C. Smith, Rumson, all of N.J.

[73] Assignee: AT&T Bell Laboratories, Murray Hill, N.J.

[21] Appl. No.: 448,835

[22] Filed: Dec. 10, 1982

[51] Int. Cl.³ .............................................. H04J 3/02
[52] U.S. Cl. ...................................... 370/85; 370/29; 370/100; 375/36; 375/106
[58] Field of Search .................... 370/85, 29, 24, 100; 375/36, 106, 111; 307/270

[56] References Cited

U.S. PATENT DOCUMENTS

| | | | |
|---|---|---|---|
| 3,751,591 | 8/1973 | Radcliffe et al. | 375/106 |
| 3,835,252 | 9/1974 | Ananiades et al. | 375/36 |
| 4,225,752 | 9/1980 | Looschen | 375/106 |
| 4,373,183 | 2/1983 | Means et al. | 370/85 |

OTHER PUBLICATIONS

"MECL System design Handbook," May 1982, Bussing With MECL 10,000 Integrated Circuits, pp. 210-215.
"Motorola MECL Data Book," 1982, pp. 3-172-3-177.

Primary Examiner—Douglas W. Olms
Attorney, Agent, or Firm—David H. Tannenbaum

[57] ABSTRACT

High density time division busses suffer from many problems, one of which is that impedance discontinuities cause signal reflections to occur along the bus. These reflections, in turn, affect the settling time and noise margins of the bus and thus reduce the time "window" in which valid signals may be received. There is disclosed a transmission bus structure which allows for bidirectional, multi-port operation by using current drivers instead of the traditional voltage drivers for placing data signals on the bus. The transmission bus is designed in a manner which allows transmission and reception from a single clock on the same clock edge thereby substantially increasing the time allowed for transmission response and also simplifying the clock distribution requirements.

9 Claims, 12 Drawing Figures

NEAR END TRANSMISSION

NEAR END TRANSMISSION $T_S < T_{CK} + T_C - T_T - T_D$ $T_H < T_T + T_D - T_C$ (WORST CASE)

FAR END TRANSMISSION $T_S < T_{CK} - T_C - T_T - T_D$ (WORST CASE)
$T_H < T_C + T_T + T_D$

NEAR END FIRST-ADJACENT TIME SLOT INTERFERENCE

FAR END FIRST-ADJACENT TIME SLOT INTERFERENCE

BUS STRUCTURE

DISTRIBUTED TIME DIVISION MULTIPLEXING BUS

BACKGROUND OF THE INVENTION

This invention relates to time division busses and more particularly to such busses having multi-point, bidirectional capability and operable for accepting circuit boards physically located at many points on a long bus.

High density time division busses suffer from many problems, one of which is that impedance discontinuities cause signal reflections to occur along the bus. These reflections, in turn, affect the settling time and noise margins of the bus and thus reduce the time "window" in which valid signals may be received at a receiving board.

Impedance discontinuities result from many factors, some controllable and some uncontrollable. One such uncontrollable discontinuity results from the removal (or non-placement) of a circuit board from a particular physical position along the bus.

This problem is compounded for bidirectional busses where data is flowing in two directions along the bus. In such situations the window must be made even more narrow. Typically, this problem is overcome by establishing two busses for interconnecting the circuit boards, one bus for signals passing *from* all circuit boards and a separate bus for signals passing *to* all circuit boards. A common control circuit would receive and retransmit all signals according to a reference clock.

In addition to signal propagation delays along the bus, account must be taken of the transmission response time delays of each individual board. In operation, a given board would receive a clock signal telling it to transmit whatever data is currently stored in its buffer. This signal must first be processed and then must turn on the necessary bus drivers in order to deliver the data to the bus. Accordingly, some period of time, called the transmission delay, occurs before valid signals are placed on the bus. This problem is compounded when a clock delay between boards is considered. These delays further reduce the window for valid data.

Thus, a need exists in the art for a bidirectional bus arrangement which allows for the spanning of long distances while still containing a transmission window wide enough for transmission in either direction between boards located at the extreme ends under all conditions.

SUMMARY OF THE INVENTION

These and other problems have been solved in our bus structure which allows for bidirectional, multi-port operation by using current drivers and where each driver/receiver becomes a part of the transmission line, instead of the traditional voltage drivers for placing data signals on the bus. The current drivers are designed having a high impedance in both the on and off states thereby reducing the impedance discontinuities resulting from transmission. Settling time of the bus is substantially reduced as reflections due to the driver's on-state output impedance are eliminated because of the nature of the current drivers.

In addition, the output capacitance of the driver/-receivers combine to become part of the characteristic impedance of the bus. This, in combination with the current source nature of the drivers, causes reflections generated as a result of missing boards to insignificantly degrade noise margins.

The bus drivers are designed to operate in conjunction with bus terminating resistors to establish a voltage in the 1- to 1½-volt range instead of a typical TTL 5-volt range. Because the drivers are operating as current sources for the bus, signal reflections due to missing boards will not re-reflect off of the driver and thus will only marginally degrade receive noise margins and die out quickly for practical configurations. In addition, the drivers are designed to turn on with a limited slew rate to insure a minimum of radio frequency radiation.

In addition to this, the drivers are designed to be held in the off state for a period of time after they are plugged into the bus so as to allow "hot" board plug in and board initialization without interference with signals on the bus.

We have designed this terminated transmission bus in a manner to transmit and to receive from a single clock on the same clock edge, substantially increasing the time allowed for transmission response and also simplifying the clock distribution requirements.

BRIEF DESCRIPTION OF THE DRAWINGS

The invention and its several other objects, features and advantages will be more fully understood from a reading of the following description of one embodiment taken in conjunction with the drawing in which.

DETAILED DESCRIPTION

Figure 1:
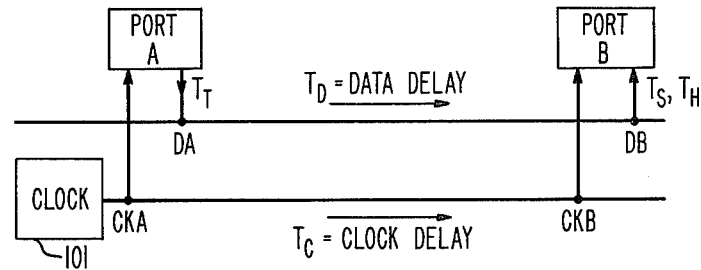
FIG. 1 shows a simplified schematic to illustrate a transmission bus having propagation delays from a port on the near end of the bus (closest to the clock source)

Before discussing the actual circuit, a discussion of the timing restraints will be given assuming no signal reflections. FIG. 1 shows a port A being at the end of the bus where clock 101 is located. This is called the near end. A second port B is at the far end of the bus. Clock signal CKA at the output of clock 101 propagates along the bus and this signal at port B (CKB) is delayed by an amount $T_C$. For a bus of 15 feet $T_C$ could equal 60 ns. Data signals DA are placed on the bus from port A and are delayed by an amount $T_D$ when they arrive (DB) at port B. Transmission delay $T_T$ is the time it takes port A to respond with a data signal in response to the proper falling edge of signal CKA.

Figure 2:
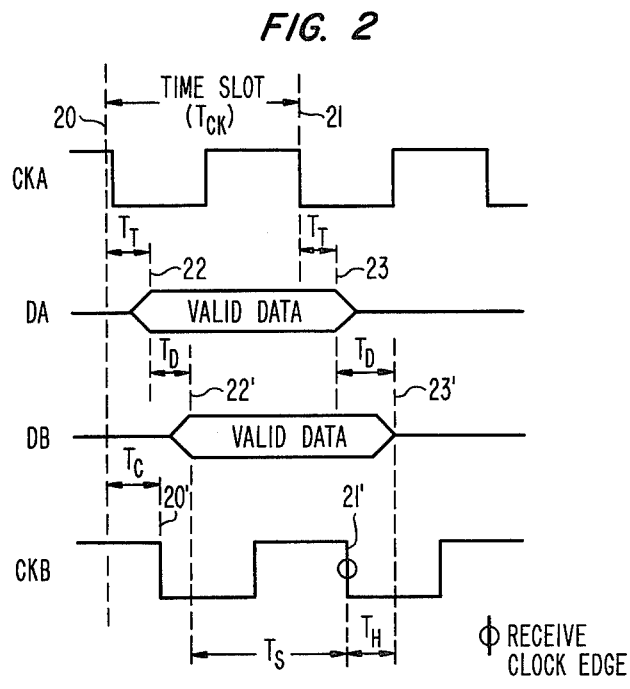
FIG. 2 is a graph showing relative times and signal delays pertaining to FIG. 1.

FIG. 2 is an illustration of the timing involved in transmitting data from port A to port B during an arbitrary given time slot. Signal CKA is used here as the reference clock and a time slot is defined from the falling edge to the following falling edge, in other words, from edge 20 to edge 21 of signal CKA. Data DA which is transmitted during this time slot with a given transmission delay $T_T$ is valid for the period shown between points 22 and 23. The data is propagating to port B is further delayed by propagation delay $T_D$ and thus is valid at port B from point 22' to point 23'. Clock signal CKB is delayed by time $T_C$ and is shown between points 20' and 21'. In the example, the data is received on the following falling edge 21'. The requirements for receiving valid data are that the data is valid some given amount of time before the Receive Clock Edge and also valid for some amount of time after the Receive Clock Edge. These two define the setup $T_S$ and hold $T_H$ time for receiving and in this system the two equations given are the requirements for setup and hold time under these transmission conditions.

Figure 3:
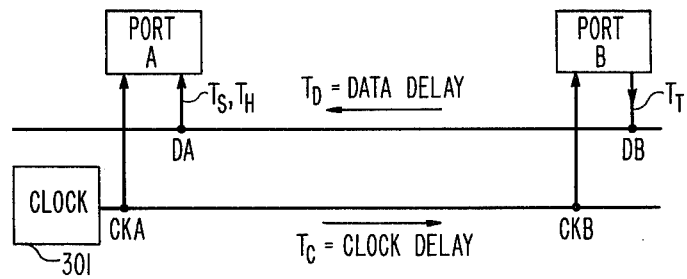
FIGS. 3 and 4 show similar information for transmission from a port on the far end of the bus.
Figure 4:
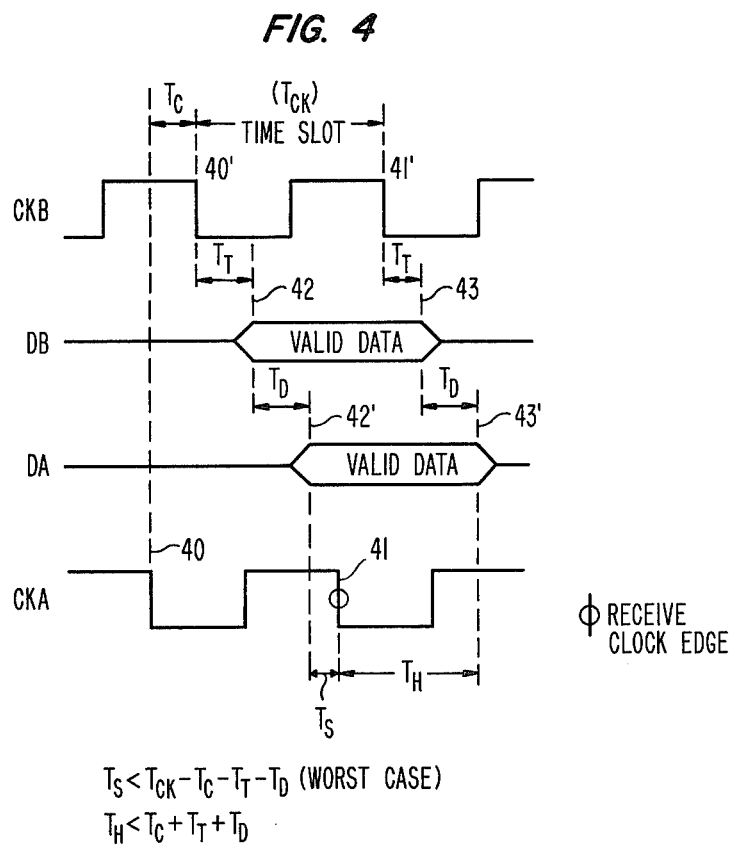

FIGS. 1 and 2 show the extreme case of what we call the near end transmission. FIGS. 3 and 4 show a similar situation but this time port B is transmitting the data while port A is receiving it. Under these conditions the setup and the hold time of the receiving station are given by a different set of requirements, and in this case shows a more stringent setup time $T_S$. Data is valid from port B a time $T_T$ after point 40' which is the trailing edge of CKB delayed time $T_C$ from point 40, which is the trailing edge of CKA. Since clock CKA occurs sooner than does clock CKB, the Receive Clock Edge, shown as point 41, also occurs sooner. This places a burden on the system since the data from port B now suffers from an additional delay, namely the delay $T_C$ of clock CKB.

In FIG. 4 we have referred all of the timing to CLKB which as discussed is delayed from CKA. The time slot is from falling edge to following falling edge of clock B or from 40' to 41'. The data transmitted at point B is further delayed by $T_T$ and this data is then delayed even more in propagating down the bus to port A so that data is valid between points 42' and 43'. Now this data must be clocked into station A with CKA at point 41. The setup time is defined from point 42' to 41, whereas the hold time is from point 41 to point 43'. These equations are different from the ones in FIG. 2, but the hold time $T_H$ of near end transmission and the setup time $T_S$ of the far end transmission are the most stringent requirements for either mode of transmission.

Figure 5:
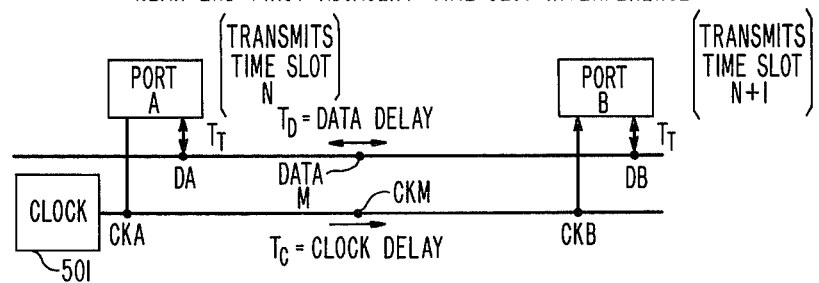
FIGS. 5 and 6 show information for a combined situation of near and far end transmission.

FIG. 5 shows the same bus as in FIGS. 1 and 3 but shown here to evaluate interference between transmissions in adjacent time slots. In this case the near end port, port A, will be transmitting first (on arbitrary time slot N), whereas the far end port, port B, will be transmitting in the following time slot N+1. The transmission from port A is intended to be properly received at any point along the bus whereas the transmission from port B which is intended to be received on the next falling edge of the clock signal will be shown not to interfere with the reception of the data from port A.

Figure 6:
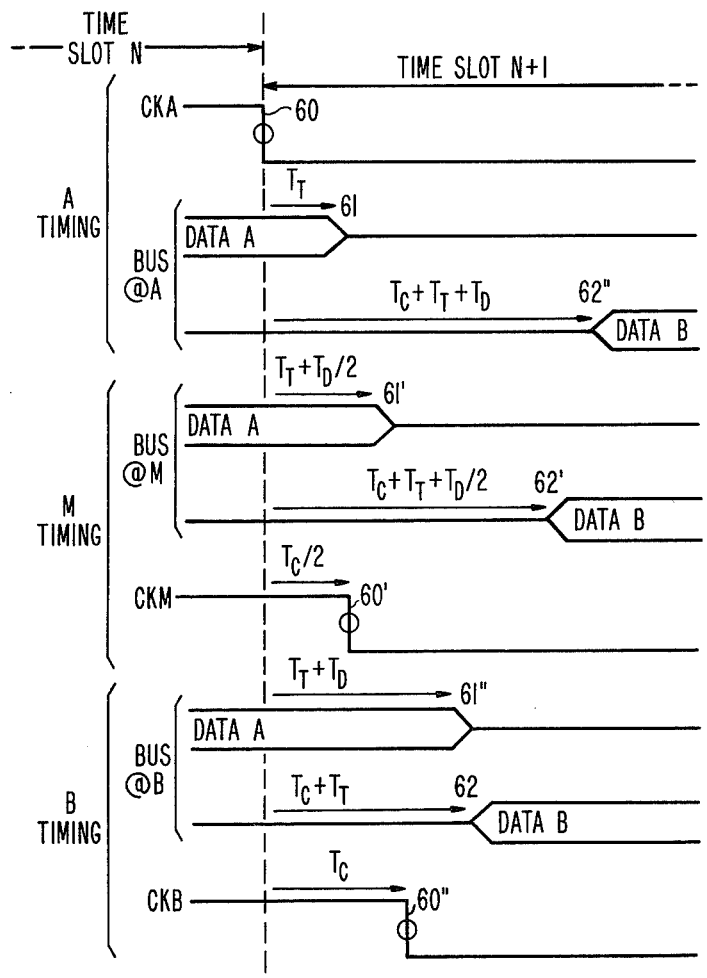

FIG. 6 shows the timing at three points along the bus. These points are at ports A and B as discussed above, and at point M, a midpoint along the bus where the clock delay equals $\frac{1}{2} T_C$. At this point the data delay equals $\frac{1}{2}$ TD. In each case the data from port A will meet the hold time requirements established in FIG. 2 for proper reception on the falling clock edge, shown as point 60 with respect to the signal at port A; point 60' with respect to the signal at point M; and as point 60'' with respect to the signal at port B.

Also, in each case the data transmitted from port B beginning at point 62 does not interfere with this reception because it does not appear on the bus until the data from port A (point 61'') is no longer valid. In the worst case, the timing from port B on the bus shows the data B from port B becoming valid just at the point where data A from port A goes away points 61'' and 62. In this case they will not interfere and the transition from the data from port A to the data from port B is smooth.

Figure 7:
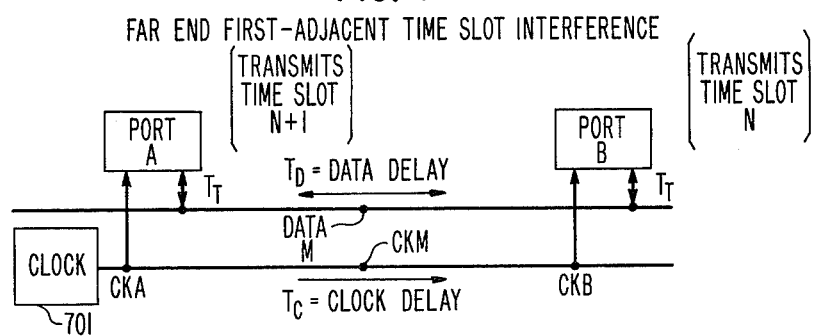
FIGS. 7 and 8 show information for a similar situation of combined near and far end transmission.
Figure 8:
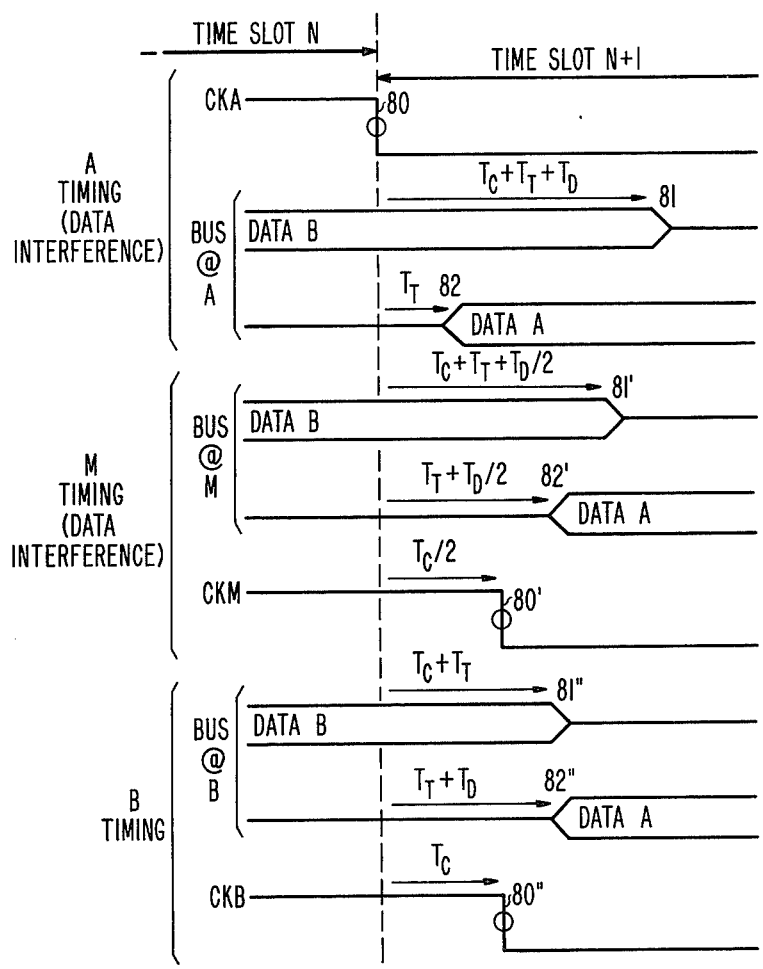

FIG. 7 shows almost the same situation as does FIG. 5 except in this case port B will transmit in time slot N and port A will follow with a transmission in time slot N+1. Again, the timing is evaluated at three points along the bus as shown in FIG. 8. At point A on the bus the data transmitted by port B remains for a considerable amount of time beyond when the data from port A is valid. This occurs because the transmission from port B is delayed additionally by both the clock delay and the data delay in propagating down and back along the bus. During this time interval port A is transmitting while the bus is actively being driven by port B. It is important to note, though, that this does not affect the proper reception of the data transmitted by port B. The data transmitted by port A is still not active on the bus until time $T_T$ delay later. This time interval where both stations are transmitting onto the bus will, however, affect the settling time of the data transmitted by port A. If port B's data is opposite that of port A, the transmission from port A may not become valid until the data from port B has gone away. Thus, port A's transmission time will be delayed beyond its originally intended time $T_T$. In addition to this problem, the double transmission at this point can cause a reflection of the data transmitted by port B and cause more radio frequency interference generated by this data bus and more bus settling time. The current source driving nature of the bus buffer eliminates these problems. The data from port A is still transmitted valid within $T_T$ and the transmission from port B simply ends on standard bus terminations. The timing at the mid point on the bus is essentially the same except that the time interval of the interference is shorter. Data B is still valid around the falling edge of CKM 80' and so it is properly received. At port B on the bus the two data transmissions are not interfering and once again the data from station B is properly received by the clock at port B, 80''.

Three significant advantages are gained with this bus operated as shown. First, only one clock is needed for bus timing, and furthermore, only one edge of this clock is important. This makes the system immune to clock distribution tolerance variations. It does not depend on duty cycle or on tolerances between multiple clocks, both of which can vary with distribution and buffering. Second, it allows the entire clock cycle for transmission time. Systems using opposite edges for transmit and receive only allow half the clock cycle, and use the other half cycle for hold time. Some systems have two-phase adjusted clocks to reduce the hold time and allow more transmit time. Thus, the clock cycle time for this bus is less constrained by its propagation delay, resulting in a clock cycle time equal to twice the propagation delay plus the driver and receiver device delays. Third, this design uses current limited drivers for the bus where significant delay differences cause multiple simultaneous bus driving, and isolates each port from these delay differences because each port only has its own local clock.

BUS STRUCTURE

Figure 9:
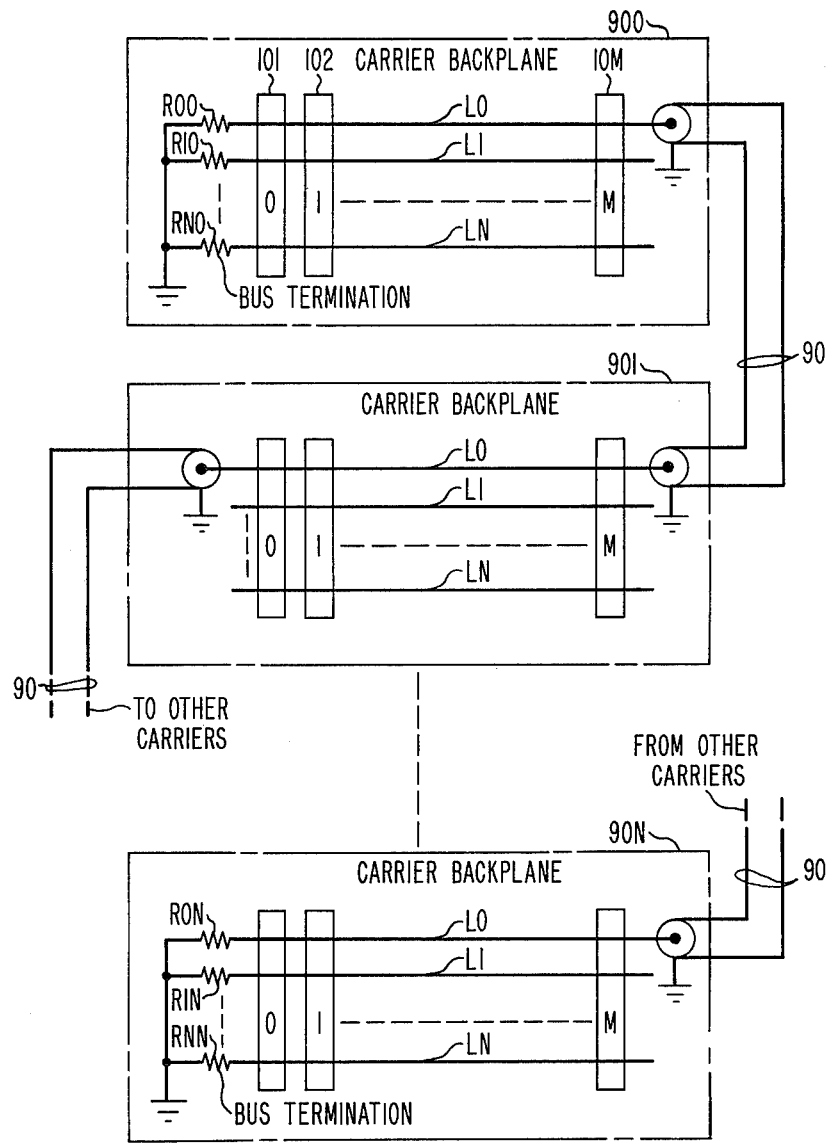
FIG. 9 shows the bus structure and backplane carrier layout.

The bus structure is shown in FIG. 9. The bus is shown having multiple paths L0-LN, each path terminating in a resistance to ground. Multiple carriers 900-90N are shown each having board positions labeled 0-M. The boards are designed with N+1 bus connections, one for each path. Each path is connected to the corresponding path in the next carrier via a coaxial cable 90. The coax cable for one path is shown, but each path of the bus is similarly interconnected with the same path of the next carrier. It should be noted that while coax cable is shown, it is only necessary to have a controlled characteristic impedance cable of the appropriate impedance. Coax cable is the best such cable available in terms of RF radiation and grounding, but other types of cable may be used.

One advantage of this structure over typical busses is that it snakes back and forth across all the carriers and thus is economical. In previous bus implementations one might find short busses on each carrier to which several boards are connected, and each short bus interconnected by some buffering to a central summing bus. Each carrier then would typically have an interface board that buffers and transmits from its own local bus to some central point. These interface boards are fairly expensive and have been eliminated with this structure since length is not a problem.

Figure 10:
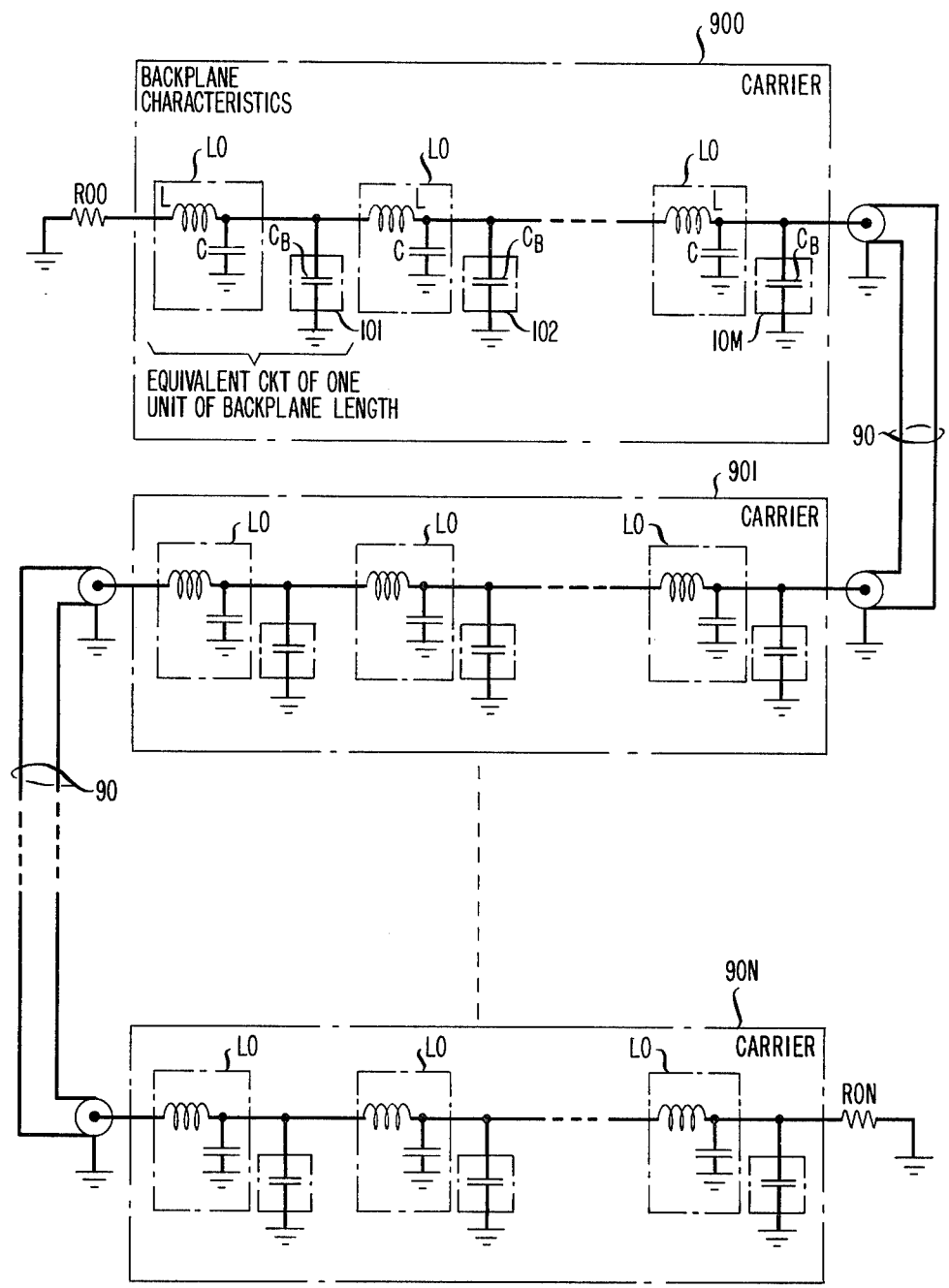
FIG. 10 shows a schematic lumped model of the transmission bus.

Another advantage can be seen from FIG. 10 which shows the electrical equivalent of FIG. 9. Each unit length of backplane consists of one board load (driver/receiver) and the self inductance and capacitance of the backplane path between board positions. When the propagation time between boards is small with respect to the risetime of the waveform (as is usually the case) the equivalent circuit is an accurate representation of the transmission line characteristics of the bus.

According to transmission line theory the characteristic impedance of the bus is given by the equation:

$$Z_0 = \sqrt{L/C} \tag{1}$$

where L and C are the inductance and capacitance of the transmission line respectively. In our embodiment the board load is mostly capacitive and the characteristic impedance becomes:

$$Z_0 = \sqrt{L/(C + CB)} \tag{2}$$

where L, C and CB are the inductance, capacitance, and the board load shown in FIG. 10.

Proper choice of L, C and CB in the above equation in combination with the current mode drivers insures that reflections resulting from regions of the bus that have no boards connected are such that the noise margin of the received signal at all bus board positions is not substantially degraded as compared to the fully populated bus. A risetime long compared to the transmission time of the bus coupled with a slight overshoot in the drivers further minimizes any signal degradations. This feature allows higher speeds and less restrictive board positioning than the prior art.

Figure 11:
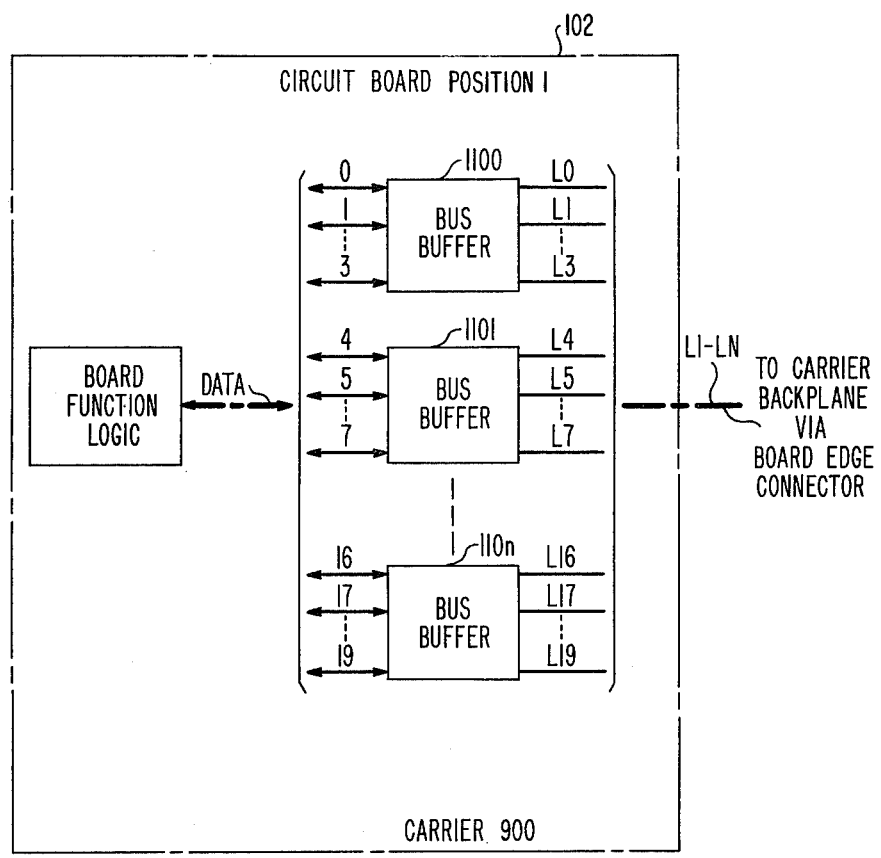
FIG. 11 shows the driver layout for each circuit board.

Shown in FIG. 11 is circuit board 102 of carrier 900 (position 1) where the bus buffers interface with the bus paths. The bus buffers 1100-110N each have four data inputs and four outputs, each input connected to logic implementing the board's function, and each output connected to a path on the carrier. Our boards each have five such buffers with inputs DATA(0-19), and outputs L0-L19.

Figure 12:
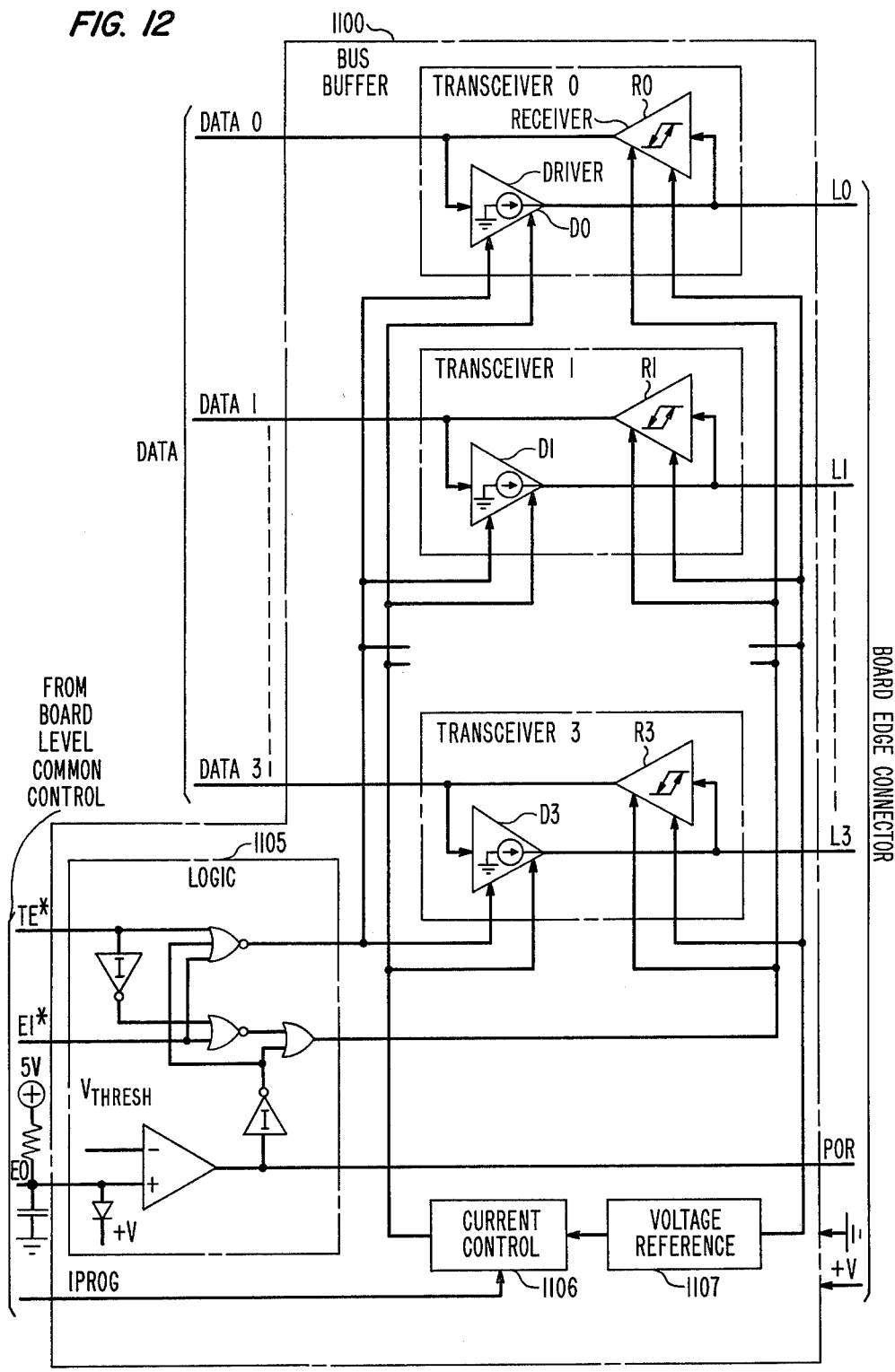
FIG. 12 shows the actual bus drivers.

FIG. 12 shows bus buffer 1100 in detail. It should be understood that while bus buffer 1100 is shown with four segments handling data on four leads, this buffer could also be designed to handle a different number of paths. There are two directions of operation—one where data flows out of the board onto the carrier's bus paths, and the other where data is received from some other remote location via the bus paths.

Bus buffer logic 1105 has three inputs–E0, E1* and TE*. The *'s indicate an active low input signal. When TE* is low, the bus buffer transmits onto the carrier backplane, and when TE* is logic high, the bus buffer receives from the carrier backplane. Lead E1* is a maintenance input. When it is low, TE* controls the data flow direction. When it is high, the device neither transmits nor receives, but the buffer is disabled isolating the board logic from the carrier backplane for maintenance purposes.

E0 is an overriding control forcing the buffer in a receive—only mode. When E0 is high, lead TE* controls the data flow direction. E0 is not a logic input, but rather a high impedance comparator type input, and is normally connected and a capacitor to ground with a high valued resistor to the 5-volt power supply. Thus, when a board is inserted into the carrier, it takes time for the voltage on E0 to build to the point where E0 is recognized as high. This delay allows logic on this circuit pack to achieve normal operation before transmission is allowed, thereby preventing the corruption of data on the carriers when a board is first plugged in.

Internal to logic 1105 is a diode from lead E0 pointing toward the plus voltage supply. This diode serves to discharge the capacitor to ground quickly when the board is unplugged from the carrier momentarily and then put back in.

The POR output is a TTL compatible version of the signal E0 to allow the other circuits on the board to know if the bus buffers are ready to transmit.

The IPROG lead to current control 1106 is a high impedance input. The voltage on this lead determines the amount of drive current the drivers send out on the various bus paths. The receiver section is designed to work on a 1.5-volt signal, and since the impedance with the back plane varies with the board spacing, different amounts of driver current will be needed to generate a 1½-volt signal for different board spacings.

For design purposes, when placing bus buffer 1100 on a circuit pack, it is necessary to keep it near the board edge to minimize parasitics and capacitance. The manner in which the pins of the device are arranged should be such as to keep the BUS paths grouped together near one end of the device and the DATA leads grouped together on the other end of the device. Power leads must be short and direct to minimize inductance in the power and ground leads. This is extremely important because of the fairly quick rise time of the current signals and the large magnitude of these signals, typically 10 nsec. and 75 ma.

OPERATION OF DRIVERS AND RECEIVERS

Each driver D0-D3 has a TTL compatible input such as input DATA0 for driver D0. The driver has a constant current output to the L0-L3 bus when transmitting a logical 1 to the bus path. As discussed, the amount of current is determined by the signal level on lead IPROG. Driver D0 has roughly the same output impedance whether or not it is driving a current. This impedance is dominated mainly by the capacitance of the device.

The receivers (R0–R3) have a TTL compatible output with three-state control. Their inputs are connected to the L0–L3 bus and have a high impedance designed to receive a 1.5-volt signal. Each receiver includes several hundred millivolts of hysteresis to improve the noise immunity of the circuit. The input levels necessary for 1 and 0 are accurately determined with the voltage reference so that this receiver achieves the same noise margins on a 1.5-volt signal that normal TTL does with a 5-volt signal.

During normal operation, the drivers on a transmitting board output a constant current for any logical 1 and no current for any logical 0. This results in voltage levels of 1.5 volts or 0 volts, respectively, because of the backplane path's characteristic impedance and the termination resistors. All other boards will be receiving by checking these voltage levels against their voltage reference 1107.

What is claimed is:

1. A communication bus terminated by an impedance at each end, said bus having evenly distributed positions along its length for connection of bus transceivers, said bus arranged as a transmission line where the inductance and capacitance of the line between said positions and the capacitance of said transceivers act as lumped circuit elements,
   said bus having a first characteristic impedance along said bus in regions where said transceivers are connected to said bus and a second higher characteristic impedance along said bus in regions where said transceivers are missing from said bus,
   said bus transceivers each including means for injecting a bilevel current signal onto said bus and means for detecting voltages resulting from either level of current signal applied to said bus from any transceiver, said detecting means including means for comparing said resulting voltages against a fixed threshold voltage level,
   said bus lumped circuit elements operative such that when said transceivers are connected at all said positions said bilevel current signal propagates from a driving transceiver past each receiving transceiver generating the same voltage signal at all transceivers, and
   said bus lumped circuit elements further operative such that when said transceivers are missing from certain regions said bilevel current signal propagating along said bus suffers reflections at said certain regions thereby changing said current signal level and also changing the resulting voltage levels detected by said transceivers at any position, said current signal changing being dependent on said first and second characteristic impedances, said characteristic impedances and said voltage threshold level selected to insure that the resulting changed voltage signals do not cross said threshold no matter how many transceivers are missing from said bus.

2. The invention set forth in claim 1 wherein said bus termination impedances are selected to be in value between the values of said first and second characteristic impedances.

3. The invention set forth in claim 1 wherein said injected signal has magnitude, and a leading edge and a trailing edge, and wherein said leading edge overshoots said magnitude to compensate for said current signal changes due to said reflections.

4. The invention set forth in claim 1 wherein each said bus transceiver includes means for inhibiting said injected signal to said bus, and
   means operable when said bus transceiver is first connected to said bus for momentarily enabling said inhibiting means.

5. The invention set forth in claim 1 wherein said bus transceivers each include means for selectively adjusting said injected signal level so that said transceiver can be used with different board spacings.

6. The invention set forth in claim 1 wherein said bus transceivers are grouped within a plurality of carriers, each carrier adapted for accepting a plurality of said bus transceivers, and
   wherein said bus includes cables interconnecting all said carriers, each said cable having a third characteristic impedance between that of said first and second characteristic impedances.

7. The invention set forth in claim 1 further comprising a bus system including a plurality of busses as described in claim 1, each said bus carrying independent bilevel current signals.

8. The invention set forth in claim 7 wherein one of said plurality of busses carries a clock signal originating from any one of its transceivers, said clock signal having beginning edges and trailing edges for establishing on said bus system a plurality of time slots,
   means at each said connected transceiver for transmitting all of said independent bilevel current signals onto said bus from that transceiver during a time slot between any two successive trailing edges of said clock signal, and
   means for detecting all said independent bilevel current signals from said bus at any said connected transceiver at the second trailing edge of said time slot.

9. A bidirectional communication bus terminated at its ends having a plurality of input/output nodes which may or may not be occupied, any one of said input/output nodes includes
   means for generating on said bus a clock signal having beginning edges and trailing edges for establishing on said bus a plurality of time slots,
   means at each said node for transmitting information onto said bus from that node during a time slot between any two successive trailing edges of said clock signal, and
   means for detecting said information on said bus at any said node at the second trailing edge of said time slot.

* * * * *